US011582385B2

(12) United States Patent
Fretter et al.

(10) Patent No.: US 11,582,385 B2
(45) Date of Patent: Feb. 14, 2023

(54) TRANSPORTABLE RECORDING APPARATUS FOR RECORDING DATA FOR A LOCALIZED PANORAMIC IMAGE OF A STREET

(71) Applicant: Parkling GmbH, Berlin (DE)

(72) Inventors: Christoph Fretter, Berlin (DE); Detlev Huelsebusch, Berlin (DE)

(73) Assignee: Parkling GmbH, Berlin (DE)

( * ) Notice: Subject to any disclaimer, the term of this patent is extended or adjusted under 35 U.S.C. 154(b) by 0 days.

(21) Appl. No.: 17/198,982

(22) Filed: Mar. 11, 2021

(65) Prior Publication Data
US 2021/0314488 A1 Oct. 7, 2021

(30) Foreign Application Priority Data

Apr. 7, 2020 (EP) .................................... 20168426

(51) Int. Cl.
*H04N 5/232* (2006.01)
*B60R 11/04* (2006.01)
*H04N 5/225* (2006.01)

(52) U.S. Cl.
CPC ......... *H04N 5/23238* (2013.01); *B60R 11/04* (2013.01); *H04N 5/2253* (2013.01)

(58) Field of Classification Search
CPC .............. H04N 5/23238; H04N 5/2253; B60R 11/04
(Continued)

(56) References Cited

U.S. PATENT DOCUMENTS 8,558,848 B2 10/2013 Meadow et al.
2006/0076379 A1* 4/2006 Hussaini ............... F25D 31/005
224/511
(Continued)

FOREIGN PATENT DOCUMENTS

EP 3318841 A2 5/2018

OTHER PUBLICATIONS

Dragomir Anguelov et al. "Google Street View: capturing the World at Street Level", Computer, Bd. 43, Nr. 6, Jun. 1, 2010, Seiten 32-38, XP055718313, USA, ISSN: 0018-9162, DOI: 10.1109/MC.2010.170.

(Continued)

*Primary Examiner* — Joseph G Ustaris
*Assistant Examiner* — Matthew David Kim
(74) *Attorney, Agent, or Firm* — Harness, Dickey & Pierce, P.L.C.

(57) ABSTRACT

The invention relates to a transportable recording apparatus for recording data for a localized panoramic image of a street for detachable mounting in and/or on a vehicle. The transportable recording apparatus has a computing unit, a buffer accumulator, a switch-mode power supply, a camera for recording a continuous film and a fastening device for the camera. Moreover, a device for satellite-based position and time determination as well as an electric power supply device for the electric power supply of the components are provided. The camera, the fastening device and the device for satellite-based position and time determination are designed separately and spatially apart from the computing unit. The transportable recording apparatus can be dismantled into individual parts. Furthermore, the invention relates to a vehicle with the transportable recording apparatus.

19 Claims, 2 Drawing Sheets

(58) Field of Classification Search
USPC .......................................................... 348/36
See application file for complete search history.

(56) References Cited

U.S. PATENT DOCUMENTS

| | | | | |
|---|---|---|---|---|
| 2011/0305927 | A1* | 12/2011 | Lev ...................... | H01M 10/18 |
| | | | | 429/129 |
| 2013/0187949 | A1* | 7/2013 | Meadow ................ | G06Q 50/16 |
| | | | | 707/769 |
| 2013/0271564 | A1* | 10/2013 | Zaffagnini ........... | H04N 5/2251 |
| | | | | 348/38 |
| 2016/0072327 | A1* | 3/2016 | Knutson ............... | H04W 88/02 |
| | | | | 320/108 |
| 2018/0241236 | A1* | 8/2018 | Vasefi ................... | H02J 7/0021 |
| 2019/0293518 | A1* | 9/2019 | Taghavi ................. | G06T 7/215 |
| 2022/0009524 | A1* | 1/2022 | Oba ................. | B60W 60/0061 |

OTHER PUBLICATIONS

European Search Report for corresponding European Patent Application No. EP 20 16 8426.3 dated Jul. 27, 2020 (in German).

* cited by examiner

TRANSPORTABLE RECORDING APPARATUS FOR RECORDING DATA FOR A LOCALIZED PANORAMIC IMAGE OF A STREET

CROSS REFERENCE TO RELATED APPLICATIONS

This application claims priority to European Patent Application No. 20 168 426.3, filed Apr. 7, 2020. The entire disclosure of the above application is incorporated herein by reference.

TECHNICAL FIELD

The invention relates to a transportable recording apparatus for recording data for a localized panoramic image of a street for detachable mounting in and/or on a vehicle. Furthermore, the invention relates to a vehicle with a transportable recording apparatus for recording data for a localized panoramic image of a street.

BACKGROUND

As a result of the population growth in urban regions, motor vehicle traffic is increasing, in particular also the individual traffic in passenger cars. Especially in the innercity area, this massive increase in traffic density leads to problems which cause a shortage of space that can no longer be solved by simple means. Further problems are not only the concomitant noise pollution through traffic, but also the exposure to contaminants which, in the meantime, is being increasingly regarded with concern.

Studies have shown that approximately 30% of inner-city traffic is not classical transportation traffic, but rather can be ascribed to drivers of vehicles in search of a parking space.

Projections for Germany reveal that 1.9 billion hours are spent on searching out parking spaces. For this, 3.2 billion liters of fuel are consumed. All in all, an economic loss in the amount of 40.4 billion Euro is assumed.

Therefore, the call for a parking space management system that reduces this vehicle traffic caused by drivers in search of a parking space makes its presence felt to an increasing extent.

In the case of such systems a basic distinction is made between two states of data ascertainment. On the one hand, static data would have to be obtained, which indicate where parking spaces are located, at which times parking in these parking spaces is permitted, and where the data also provides information as to how the parking spaces are to be parked in, e.g. as lengthways or cross-wise parking. This data also includes information about no-parking zones as well as possible parking fees. Such data are referred to as "static data" and constitute the fundamental prerequisite for a parking space management.

The second state of data ascertainment resides in ascertaining so-called "dynamic data" which represent information on the current parking space occupancy situation.

One possibility of ascertaining static data is known from DE 10 2018 214 510 A1, for example. In this case, however, only information as to whether a parking space is available or not can be ascertained. Data indicating at which times parking is permitted or whether an indicated parking space is a driveway, for example, can only be established with great difficulty.

A known possibility of ascertaining localized data of a street resides for example in the use of specifically equipped vehicles as they are employed to produce the data for the Google STREET VIEW® application. These have a complex roof structure that often has a height of at least 1 m and several separate individual cameras, as well as a GPS-receiver. The cameras serve to produce individual pictures. For the electric power supply of this system, large batteries are installed in the interior of the vehicle. In addition, these vehicles, in most cases, have firmly built-in, bulky servers located in the trunk area, which are provided to process and record the data. The corresponding vehicles from Apple, Inc. are similar in structure.

However, the problem with these vehicles is that for obtaining recordings in another region they first have to be transported there. Thus, it is necessary to physically transport the entire vehicle there, e.g., by driving it to the place. Depending on the precise location of the new place, transport by ferry or the like is often necessary, too. In addition, depending on the precise construction, these vehicles are in most cases required to be approved or certified by the Technical Inspection Authority (TÜV) as the installation of further batteries in the vehicle may be of safety relevance.

SUMMARY

The invention is therefore based on the object to provide a recording apparatus which is transportable and overcomes the drawbacks of the known systems.

In accordance with the invention this object is achieved by a recording apparatus having the features set forth in one or more, or all, of the appended claims.

Advantageous embodiments of the invention are also presented in the following Detailed Description, as well as the Figures and their explanation.

In an embodiment, a transportable recording apparatus is provided which has a computing unit, a buffer accumulator and a switch-mode power supply for converting the voltage of an on-board energy supply of the vehicle into voltage for the transportable recording apparatus. Furthermore, the recording apparatus has a camera for recording a continuous film and a fastening device for positioning the camera in and/or on the vehicle. In addition, a device for satellite-based position and time determination is provided as well as an electric power supply device for the electric power supply of the computing unit, the camera and the device for satellite-based position and time determination. The electric power supply device is coupled with the switch-mode power supply and the buffer accumulator.

Further in accordance with the invention, a generic transportable recording apparatus is improved in that the camera, the fastening device and the device for satellite-based position and time determination are provided separately and spatially apart from the computing unit. Within the framework of the invention this also makes possible, in particular, that the camera, the fastening device and the device for satellite-based position and time determination are in each case able to be designed separately from each other. Furthermore, the transportable recording apparatus is constructed so as to be separable into individual elements, wherein each of the individual elements has a maximum size and weight suitable for a passenger aircraft.

The invention is based on the finding that deviation from known constructions of systems corresponding to those used with the Google STREET VIEW® application, for example, can be made in that on the one hand a different recording system is used, and on the other hand the individual parts or elements are dimensioned and constructed such that they can be dismantled and transported individually.

This is achieved on the one hand in that, in contrast to the known systems, rather than using several cameras that produce individual images, instead a single camera is used which is suitable to record a continuous film. On the other hand, according to the invention, provision is made in that the individual parts or individual elements of the transportable recording apparatus are dimensioned and can be combined such that they can be dismantled or are provided separately and spatially apart from the computing unit from the very outset.

Furthermore, the individual parts each have a size and a weight to enable them to be transported in a passenger aircraft. Within the meaning of the invention this is understood, in particular, in that they can be carried as regular luggage of a passenger in an aircraft. This means that as a rule they have a maximum weight not exceeding 32 kg, ideally less than 23 kg, and also have the appropriate dimensions for check-in as regular luggage. As a matter of course, it is also possible for individual elements to be of such weight and dimensions that they can be transported in the cabin as hand luggage.

According to the invention the resultant advantage is that the entire recording apparatus is transportable, allowing it to be transported relatively easily from one place to another. Thus, it is possible, for example, to take the transportable recording apparatus according to the invention onto an aircraft, fly to a city, hire a rental vehicle there, install the transportable recording apparatus in or on the said vehicle and produce the relevant data for a localized panoramic image of a street within a few days. Afterwards, the transportable recording apparatus can again be flown to another city and the relevant data can be produced there.

In a preferred embodiment an energy limiting device is provided which limits the maximum current intensity demanded from the on-board energy supply of the vehicle. According to the solution pursuant to the invention, provision is not made for large separate energy stores, i.e., batteries or accumulators of the transportable recording apparatus in the vehicle, as is the case with the Google-type systems. This means on the other hand that energy can solely be used from the on-board energy supply system of the vehicle. In most cases, the vehicle will have a 12 Volt system, the on-board power socket of which, typically the cigarette lighter, can only cope with a maximum current intensity. By making use of the energy limiting device according to the invention it is thus ensured that the on-board energy supply network of the vehicle is not overburdened.

To further adapt the transportable recording apparatus to the exclusive use of an on-board energy supply of the vehicle, provision is made for the electric power supply device to receive its energy via the buffer accumulator.

Modern vehicles often feature an automatic start-stop-mechanism, so that in the on-board energy supply system current peaks or drops arise, for instance, when the engine is restarted or during use of an automatic start-stop-mechanism. These current peaks or temporary blackouts can be buffered in that the electric power supply device generally receives its energy via the buffer accumulator.

It is advantageous if the electric power supply device, the buffer accumulator and the switch-mode power supply are designed to provide electric energy having a voltage between 11 Volt and 16 Volt, in particular in the range of 14.4 Volt. Basically, a transformer, a corresponding power supply and/or a voltage converter can also be used instead of the switch-mode power supply. What is important here is that the apparatus used converts the voltage of the vehicle to the desired voltage level. According to the invention, the realization was made that this voltage is particularly suitable to supply electric power to the further components of the transportable recording apparatus. Those further components are, in particular, the camera, the device for satellite-based position and time determination and the computing unit.

Basically, any type of accumulator can be deployed as the buffer accumulator. A lithium iron phosphate accumulator has proved to be advantageous. In particular, this offers the advantage that it is relatively robust in comparison to lithium-ion or lithium-polymer accumulators. This means that it is particularly stable and insensitive to impacts or shocks. This is advantageous since the accumulator is used in vehicles when recording the data. Compared to lead-acid and lead-gel accumulators, there is the advantage of lower weight, and also that it is permissible to carry such lithium iron phosphate accumulators on board of an aircraft and for shipment.

In conjunction with this it is preferred if the buffer accumulator has a capacity of less than 100 Wh, in particular in the range of 30 to 40 Wh. Such a dimensioning renders it possible to transport the buffer accumulator, or rather the transportable recording apparatus, by aircraft, to some extent even in the hand luggage compartment, without first having to obtain specific authorizations or the like for this. In addition, such a capacity suffices to supply the transportable recording apparatus with its individual elements with a sufficient energy buffer within the framework of energy supply.

By preference, the electric power supply device has power connections for the supply of the camera and the device for satellite-based position and time determination. Due to the fact that both the camera and the device for satellite-based position and time determination are provided as separate components, they are dependent on an energy supply. Basically, it would also be possible to connect these directly to the energy supply, or rather to the energy supply system, of the vehicle, in which case, however, the advantages, such as a buffering in the event of temporary electric power failures and the monitoring of the required energy, could not be realized or only realized with great difficulty.

In a preferred embodiment the computing unit is of a passively cooled design. This means that the computing unit in particular has no active ventilators or the like but only features cooling bodies of sufficiently large dimensions. In addition, the further units of the computing unit can also be designed such that they produce little waste heat so that the required cooling capacity can be on a low level.

In this respect it is also preferred if the entire computing unit has no movable parts. As a result, the computing unit is of more robust design so that it is easier to transport and less prone to errors and failures. This is particularly important because, as already set out, it is mounted in a vehicle in which shocks and the like inevitably occur. Moreover, due to less or no movable parts, it becomes more dust-resistant, which in turn facilitates transport considerably.

It is advantageous if the computing unit has an HDMI Capture card and, in particular, records the data of the camera which produces a continuous film. Basically, other interfaces could also be used for this, however an HDMI interface provides a simple and practicable solution for this purpose.

As a further component in the transportable recording apparatus, a preparation device can be provided which is designed to prepare at least time data of the device for satellite-based position and time determination into a format recordable for the camera as coded time data, and to forward this to the camera for recording. By means of this preparation device, it is rendered possible that in addition to the film, time data are recorded by the camera. In combination with the time data of the device for satellite-based position and time determination, which are also evaluated and stored by the computing unit, it is possible to precisely localize the film. In this way, highly accurate data can be used to produce the localized panoramic image of a street.

Transport of some components of the transportable recording apparatus can be facilitated in that the computing unit, the electric power supply device, the buffer accumulator and/or the switch-mode power supply are provided in a joint, in particular in a case-like housing. In other words, this case can constitute an individual element of the transportable recording apparatus. The further individual elements can, for example, be the camera, the device for satellite-based position and time determination, as well as the fastening device for positioning the camera in and/or on the vehicle.

The case-like housing, which can also be referred to simply as the case, is designed such that it can be fixed in the interior of the vehicle, for example, by means of the ISOFIX fastenings existing there in most cases, or existent seat belts on a seat of the vehicle. This, in turn, facilitates the flexible use of the transportable recording apparatus as no specific complicated fastening points need to be present in the vehicle.

In addition, the transportable recording apparatus can also have a Lidar sensor. For example, this can be a 1D sensor, but also a 2D- or 3D-Lidar sensor. With this it is possible during the recording of the continuous film by the camera to ascertain additional distance data that are available as additional data for the localized panoramic image of a street and can provide further information for the analysis of potential parking spaces.

Furthermore, the invention relates to a vehicle with a transportable recording apparatus according to the invention for ascertaining data for a localized panoramic image of a street.

BRIEF DESCRIPTION OF DRAWINGS

The invention is explained in greater detail hereinafter by way of a schematic exemplary embodiment with reference to the Figures, wherein.

DETAILED DESCRIPTION

Figure 1:
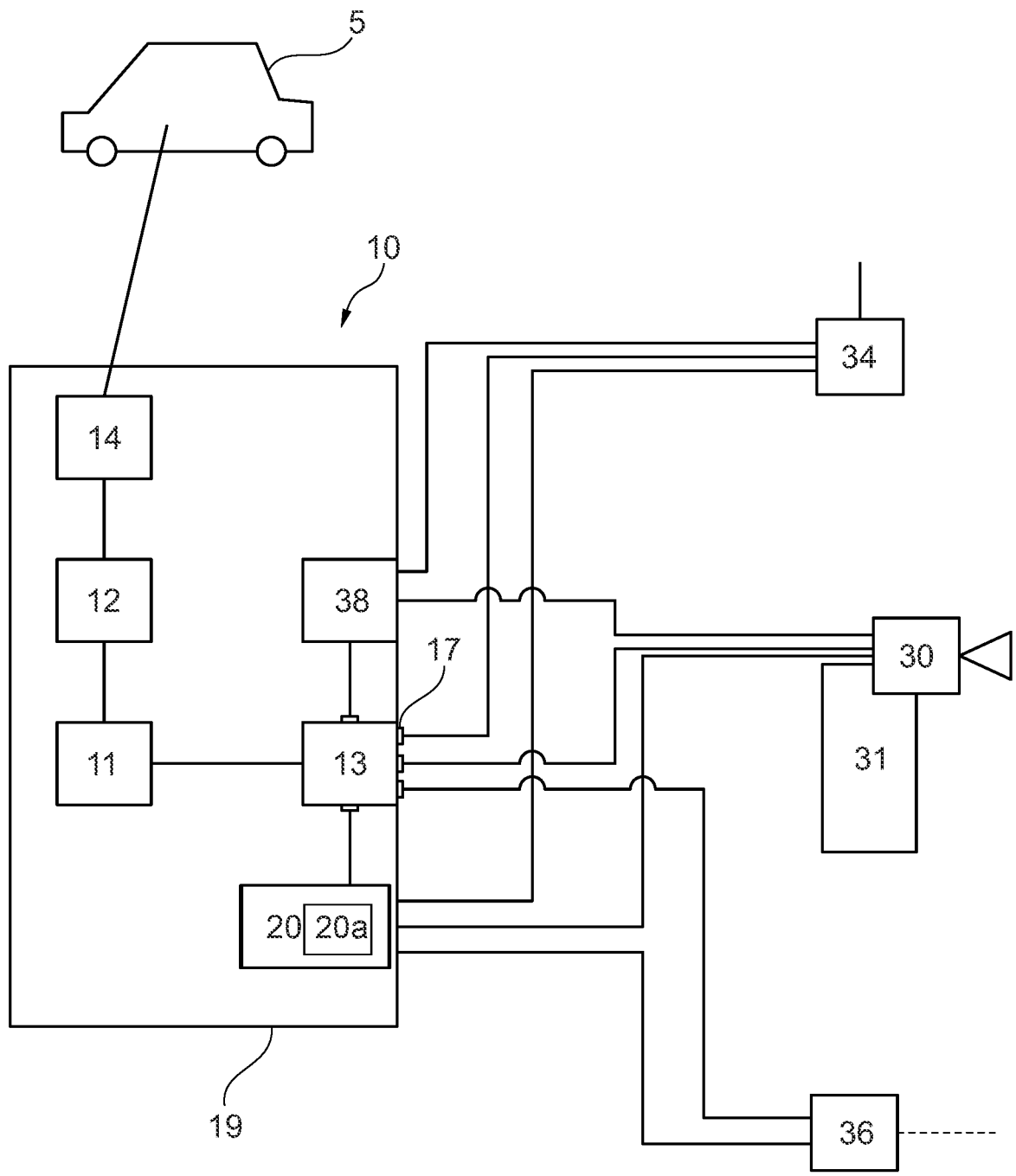
FIG. 1 is a schematic view of a transportable recording apparatus according to the invention for recording data for a localized panoramic image of a street.

FIG. 1 shows a highly simplified schematic illustration of a transportable recording apparatus 10 according to the invention for recording data for a localized panoramic image of a street 60.

The transportable recording apparatus 10 according to the invention has several individual components. A major portion of the components of the apparatus 10 are provided in a joint housing or case 19.

Within the joint housing 19 is located an energy limiting device 14, a switch-mode power supply 12, a buffer accumulator 11 and an electric power supply device 13. The electric power supply device 13 in turn has several power supply connections 17. In addition, the joint housing 19 houses a computing unit 20 and a preparation device 38.

Externally of the joint housing 19, at least a camera 30 and a device for satellite-based position and time determination 34 are provided in accordance with the invention. The camera 30 is attached on a fastening device 31. Optionally, a Lidar sensor 36 can be present.

By preference, the camera 30 is a model capable of issuing a continuous film in the 4K-UHD standard with at least 24 images per second. This camera is attached by means of the fastening device 31 inside the vehicle 5 so that during movement of the vehicle 5, it can film from a side window and thereby record the continuous film.

The device for satellite-based position and time determination 34 can, for example, be a device for satellite-based position and time determination 34 operating according to the GPS, Galileo, Glonass and/or Beidou standard. It is also possible for the device for satellite-based position and time determination 34 to use several of these standards simultaneously in order to enhance the quality of the ascertained position.

As the device which forms the Lidar scanner or sensor 36, a 1D-Lidar scanner is preferably used that determines the distance between the next object and the Lidar scanner 36 by itself. The latter is preferably aligned perpendicularly to the direction of travel of the vehicle 5 in the same way as the camera 30. As a matter of course, use can also be made of 2D- or 3D-Lidar sensors that ascertain a correspondingly larger amount of data and further information.

In the following discussion, the basic functionality of the transportable recording apparatus 10 according to the invention is described before enlarging on its precise construction which is of particular importance for the possibility of easy transport.

To ascertain and record the data for the localized panoramic image of a street 60, mounted in the vehicle 5 is the housing 19 containing the computing unit 20 and the various sub-units required within the framework of electric power supply, the limiting device 14, the switch-mode power supply 12, the accumulator 11 and the electric power supply 13. In addition, the device for satellite-based position and time determination 34 is attached to the roof of the vehicle 5 for better reception. By means of its fastening device 31 the camera 30 is mounted on the back seat of the vehicle 5. In this connection, provision is made for the camera 30 to be aligned facing laterally out of a vehicle window so that it is able to make a lateral recording. This recording is preferably produced in the upright format. What is important in this respect is that the recording angle, in particular, also includes the area lying precisely perpendicular to the direction of travel of the vehicle 5.

In addition, the Lidar sensor 36, if such a sensor is provided, can either be attached by means of the fastening device 31 of the camera 30 or also in a separate way, for example, on the bumper or the exterior door of the vehicle 4.

To ascertain the data for the localized panoramic image of a street 60, as the vehicle 5 moves through a city, for instance along a street, a continuous film is recorded thereof by the camera 30. At the same time, data are recorded by the device for satellite-based position and time determination 34. These data are forwarded to the preparation device 38. In the preparation device 38 the data are re-coded into a format recordable for the camera 30 and then forwarded to the camera. In particular, this is an acoustic coding that contains the time data which can thus be recorded simultaneously with the film. This film is preferably stored via an HDMI Capture card in the computing unit 20 on a storage device. In addition, the position and time data of the device for satellite-based position and time determination 34 are also stored on storage 20*a* of the computing unit 20. Similarly, the data of the Lidar sensor 36 can also be stored on the storage 20*a* of the computing unit 20.

For this purpose, it is possible that the Lidar sensor 36 also has an input for the data of the device for satellite-based position and time determination 34. This is not shown in FIG. 1.

Figure 2:
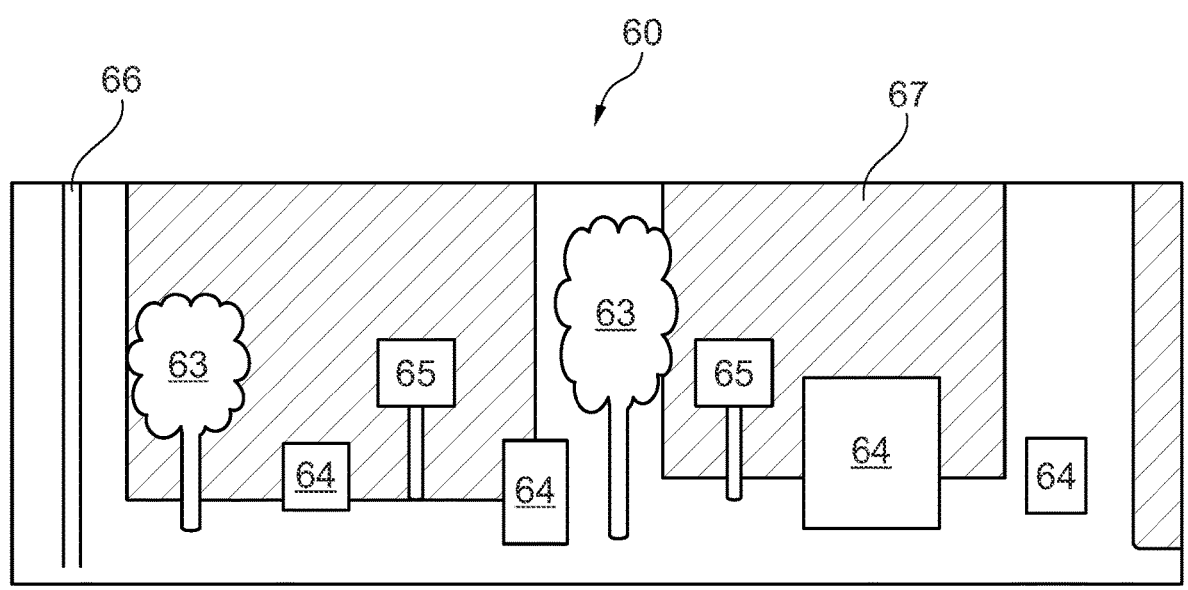
FIG. 2 is a highly simplified panoramic image of a street.

Based on the thus recorded data from the film of the camera 30, when taken in connection with the precise time-stamp and the position data of the device for satellite-based position and time determination 34, it is possible to determine the precise location of the recording, from which a localized panoramic image of a street 60 can then be produced, as illustrated in FIG. 2.

The central aspect of the invention of the transportable recording apparatus 10 is that it is dimensioned and constructed such that its individual components can be carried relatively easily on board an aircraft. This means that the transportable recording apparatus 10 can be carried by a passenger either as hand luggage or as checked-in luggage. Thus, there is no need for components to be transported by air freight.

For this purpose, it is essential, for example, that no large separate batteries are provided in the transportable recording apparatus 10. As the sole source of energy, the energy supply of the vehicle 5, or rather its on-board energy supply system, may be drawn upon. Therefore, according to the invention several components are provided to enable trouble-free operation of the recording apparatus 10 according to the invention by using solely the on-board energy supply of the vehicle 5.

For this, the limiting device 14, the switch-mode power supply 12, the buffer accumulator 11 and the central electric power supply 13 are provided. The limiting device 14 serves the purpose of ensuring that the energy demanded or drawn from the on-board energy supply system of the vehicle 5 is limited to the maximum amount that the on-board energy supply system of the vehicle 5 can cope with. This prevents fuses or the like in the vehicle 5 from possibly blocking the electric power supply.

By means of the switch-mode power supply 12, the energy supply provided by the vehicle 5 can be converted into a current intensity and voltage required for the transportable recording apparatus 10.

The transfer of the energy via the buffer accumulator 11 serves the purpose of buffering fluctuations of current that occur during the energy consumption in the individual components of the transportable recording apparatus 10. Provision is made in that the accumulator 11 is constantly supplied with energy by the energy supply of the vehicle 5 whilst, however, being able to deliver the said energy in a flexible way via the electric power supply device 13 with its power connections 17 to the components, such as the camera 30, the Lidar sensor 36 or also the device for satellite-based position and time determination 34. Within the meaning of the invention, the term "constant" means that the accumulator 11 is permanently connected to the energy supply. This also takes account of the fact that the voltage supply of the vehicle 5 is not static, but that undervoltage situations and temporary failures occur, too. The same also applies to the computing unit 20. This is of particular importance if the vehicle 5 operates with an automatic start-stop-mechanism that causes so-called brown- and blackouts, as a result of which no continuous electric power supply is provided by the vehicle 5.

As illustrated in FIG. 1, a major portion of the components of the apparatus 10 are provided in a joint housing 19. However, the camera 30 with its fastening device 31, the device for satellite-based position and time determination 34, as well as the Lidar sensor 36, are all provided separately thereto. This has the advantage that these components can be transported individually by a passenger in an aircraft, as set out previously.

In FIG. 2 a highly schematic example of a produced panoramic image of a street 60 is illustrated. When preparing the data the continuous film data produced by means of the camera 30 are processed and assembled to a panoramic image of a street 60 that has no or hardly any optical distortions where possible. On the panoramic image of the street 60 individual objects 64, such as not only cars or trucks located on parking spaces, but also signs 65 can then be recognized. On these signs 65 parking information can be present, for example. Likewise, complete streetlamps 66 or sections thereof are illustrated, for example. What is important here is that the curbside is present in order to ascertain a sufficient amount of data for static information for the parking management system. The objects shown hatched in FIG. 2 are, for example, houses 67 located in the background.

By way of the transportable recording apparatus 10 according to the invention, it is thus possible to record data for a localized panoramic image of a street in a flexible way at different locations.

The invention claimed is:

1. A transportable recording apparatus for recording data for a localized panoramic image of a street, and configured for detachable mounting in and/or on a vehicle and to be powered from the vehicle's electrical system, the apparatus comprising:
   a housing having a form factor enabling transport on a passenger aircraft, the housing including:
      a switch-mode power supply for receiving power from the vehicle's electrical system;
      a computing unit,
      a buffer accumulator for smoothing out fluctuations associated with power being received from the vehicle's electrical system,
      the switch-mode power supply further configured for converting a voltage of an on-board energy supply received from the vehicle's electrical system into voltage for powering the transportable recording apparatus,
      an energy limiting device which limits a maximum current intensity demanded from the vehicle's electrical system; and
      an electric power supply device being configured to receive power via the buffer accumulator;
   a camera for recording a continuous film, and
   a fastening device for positioning the camera in and/or on the vehicle apart from the housing,
   a device for satellite-based position and time determination,
   the electric power supply device configured to receive electric power from the buffer accumulator and to provide the electric power to the computing unit, to the camera, and to the device for satellite-based position and time determination
   wherein the camera, the fastening device and the device for satellite-based position and time determination are provided separately and spatially apart from the housing;

wherein the transportable recording apparatus is designed to be separable into individual elements, wherein each of the housing, the camera, the fastening device, and the device for satellite-based position and time determination each have a maximum size and weight that is suitable for transport in a passenger aircraft.

2. The transportable recording apparatus according to claim 1, wherein the electric power supply device, the buffer accumulator and the switch-mode power supply are designed to provide electric energy having a voltage between 11 V and 16 V.

3. The transportable recording apparatus according to claim 1, wherein the electric power supply device, the buffer accumulator and the switch-mode power supply are designed to provide electric energy having a voltage of about 14.4 V.

4. The transportable recording apparatus according to claim 1, wherein the buffer accumulator comprises a lithium iron phosphate accumulator.

5. The transportable recording apparatus according to claim 1, wherein the buffer accumulator has a capacity of less than 100 Wh.

6. The transportable recording apparatus accordingly to claim 1, wherein the buffer accumulator has a capacity range of 30 Wh to 40 Wh.

7. The transportable recording apparatus according to claim 1, wherein the electric power supply device has power connections for the supply of the camera and the device for satellite-based position and time determination.

8. The transportable recording apparatus according to claim 1, wherein the computing unit comprises a passively cooled design.

9. The transportable recording apparatus according to claim 1, wherein the computing unit has no movable parts.

10. The transportable recording apparatus according to claim 1, wherein the computing unit includes an HDMI Capture card.

11. The transportable recording apparatus according to claim 1, further comprising a preparation device which is designed to prepare, through an acoustic coding operation, at least time data of the device for satellite-based position and time determination into a format recordable for the camera as coded time data, and to forward the coded time data to the camera for recording.

12. The transportable recording apparatus according to claim 1, further comprising a Lidar sensor for determining a distance between an object remote from the vehicle and the Lidar sensor, and providing information relating to the distance to the computing unit.

13. The transportable recording apparatus of claim 1, further comprising the vehicle having the transportable recording apparatus mounted or carried thereon, and where the transportable recording apparatus is configured to be removable from the vehicle.

14. The transportable recording apparatus according to claim 1, wherein the housing forms a case-like housing.

15. The transportable recording apparatus according to claim 14, wherein the case-like housing is a fixedly securable in an interior of the vehicle.

16. The transportable recording apparatus according to claim 15, wherein the case-like housing is fixedly securable in the interior of the vehicle by at least one of:
an Isofix fastening system; or
at least one existing seat belt on a seat of the vehicle; or
both an Isofix fastening system and at least one existing seat belt of the vehicle.

17. A transportable recording apparatus for recording data for a localized panoramic image of a street, and configured for detachable mounting in and/or on a vehicle and configured to be coupled to, and powered by, the vehicle's electrical system, the apparatus comprising:
a camera for recording a continuous film,
a fastening device for positioning the camera in and/or on the vehicle,
a device for satellite-based position and time determination,
a single housing for enclosing:
a computing unit,
a buffer accumulator,
a switch-mode power supply for converting the voltage of an on-board energy supply supplied by the vehicle's electrical system into voltage for powering the transportable recording apparatus,
an electric power supply device for receiving electric power from the buffer accumulator and providing electric power to the computing unit, to the camera, and to the device for satellite-based position and time determination,
wherein the camera, the fastening device and the device for satellite-based position and time determination are provided separately and spatially apart from the single housing;
wherein the transportable recording apparatus is designed to be separable into individual elements including the housing, the camera, the fastening device, and the device for satellite-based position and time determination, wherein each of the individual elements has a maximum size and weight that is suitable for transport in a passenger aircraft; and
wherein the single housing is removably securable within or on the vehicle apart from the camera and apart from the device for satellite-based position and time determination.

18. The transportable recording apparatus according to claim 17, further comprising an energy limiting device which limits a maximum current intensity demanded from the on-board energy supply of the vehicle.

19. A method for recording using from a moving vehicle to create a localized panoramic image of a street, the method comprising:
providing a plurality of components forming a transportable recording apparatus, which are able to be carried by an individual to a vehicle and disposed within or on the vehicle, the components including:
a housing for enclosing;
a computing unit;
a switch-mode power supply for receiving electric power supply from the vehicle's electrical system and converting a voltage of an on-board energy supply of the vehicle into voltage for the transportable recording apparatus;
a buffer accumulator for receiving an output from the switch-mode power supply and smoothing a delivery of the electrical power output to the components forming the transportable recording apparatus;
and
an electric power supply device;
a camera for recording a continuous film;
a fastening device for positioning the camera in and/or on the vehicle;

a device for satellite-based position and time determination of the vehicle as the vehicle travels, and providing data relating to satellite-based position and time to the camera;

the electric power supply device receiving electric power from the buffer accumulator and for providing electric power to the computing unit, to the camera, and to the device for satellite-based position and time determination, which is coupled with the switch-mode power supply and the buffer accumulator, configuring the camera, the fastening device and the device for satellite-based position and time determination as separate elements apart from the housing, and wherein each of the separate elements, including the housing, has a maximum size and weight that is suitable for transport in a passenger aircraft;

using the fastening device to support the camera in, or on, the vehicle in a manner in which the camera is able to view a scene which includes a street; and using the camera and the device for satellite-based position and time determination to create a film which includes coded position and time data, which said film is used to create a localized panoramic image of the street in real time.

\* \* \* \* \*